(12) United States Patent
Shen et al.

(10) Patent No.: US 9,825,518 B2
(45) Date of Patent: Nov. 21, 2017

(54) SYSTEM AND METHOD FOR OVER-CURRENT PROTECTION

(71) Applicant: GE ENERGY POWER CONVERSION TECHNOLOGY LTD, Warwickshire (GB)

(72) Inventors: Jie Shen, Bayern (DE); Stefan Schroeder, Bayern (DE); Kunlun Chen, ShangHai (CN); Laigui Qin, ShangHai (CN)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 75 days.

(21) Appl. No.: 14/438,091

(22) PCT Filed: Oct. 30, 2013

(86) PCT No.: PCT/US2013/067411
§ 371 (c)(1),
(2) Date: Apr. 23, 2015

(87) PCT Pub. No.: WO2014/070835
PCT Pub. Date: May 8, 2014

(65) Prior Publication Data
US 2015/0295488 A1  Oct. 15, 2015

(30) Foreign Application Priority Data
Oct. 30, 2012  (CN) .......................... 2012 1 0425030

(51) Int. Cl.
*H02M 3/335*  (2006.01)
*H02M 1/32*  (2007.01)
(Continued)

(52) U.S. Cl.
CPC ......... *H02M 1/32* (2013.01); *H02M 3/33507* (2013.01); *H02H 3/006* (2013.01); *H02H 7/10* (2013.01); *H02M 7/483* (2013.01)

(58) Field of Classification Search
CPC . H02M 3/33507; H02M 1/32; H03K 17/0822
(Continued)

(56) References Cited

U.S. PATENT DOCUMENTS

| 4,415,960 A | 11/1983 | Clark, Jr. |
| 6,867,573 B1 | 3/2005 | Carper |

(Continued)

FOREIGN PATENT DOCUMENTS

| CN | 100487995 C | 5/2009 |
| CN | 101527558 A | 9/2009 |

(Continued)

OTHER PUBLICATIONS

Iwamuro et al., "A New Vertical Igbt Structure with a Monolithic Over-Current, Over-Voltage, and Over-Temperature Sensing and Protecting Circuit", IEEE Electron Device Letters, vol. 16, Issue 9, pp. 399-401, Sep. 1995.

(Continued)

*Primary Examiner* — Nguyen Tran
(74) *Attorney, Agent, or Firm* — GE Global Patent Operation; Scott R. Stanley (57) ABSTRACT

An exemplary power conversion system includes a power conversion device and a control system. The power conversion device converts electrical power from one form to another. The power conversion device includes at least one switching element capable of being turned off to block an electrical current flowing through the at least one switching element. The control system is electrically coupled to the power conversion device for monitoring an electrical current flowing through the at least one switching element and for (Continued)

monitoring at least one parameter in association with the operation of the power conversion system. The control system further generates an over-current threshold value that is variable with respect to at least one monitored parameter.

14 Claims, 5 Drawing Sheets

(51) Int. Cl.
    *H02H 3/00*     (2006.01)
    *H02H 7/10*     (2006.01)
    *H02M 7/483*     (2007.01)

(58) Field of Classification Search
    USPC ......... 363/21.12–21.18, 55–56.12, 93.1–101
    See application file for complete search history.

(56) References Cited

U.S. PATENT DOCUMENTS

| | | | |
|---|---|---|---|
| 7,586,726 | B2 | 9/2009 | Maebara et al. |
| 7,817,391 | B2 | 10/2010 | Kimber |
| 8,018,745 | B2 | 9/2011 | Fang et al. |
| 8,045,310 | B2 | 10/2011 | Zanardi et al. |
| 8,559,152 | B2 * | 10/2013 | Cao ................. H02M 1/32 361/103 |
| 2005/0099751 | A1 | 5/2005 | Kumagai |
| 2006/0171175 | A1 | 8/2006 | Zhu et al. |
| 2007/0279820 | A1 | 12/2007 | Fang et al. |
| 2008/0116872 | A1 | 5/2008 | Nakazono |
| 2009/0014433 | A1 | 1/2009 | O'Neil et al. |
| 2009/0161726 | A1 | 6/2009 | Miyamoto et al. |
| 2011/0211282 | A1 | 9/2011 | Nanov |

FOREIGN PATENT DOCUMENTS

| | | |
|---|---|---|
| DE | 4330944 A1 | 3/1995 |
| DE | 102006024018 A1 | 11/2007 |
| WO | 2011085837 A2 | 7/2011 |

OTHER PUBLICATIONS

International Search Report dated Feb. 6, 2014 which was issued in connection with PCT Patent Application No. PCT/US13/067411 which was filed on Oct. 30, 2013.

Unofficial English Translation of Chinese Office Action issued in connection with corresponding CN Application No. 201210425030.8 on Jan. 20, 2016.

\* cited by examiner

SYSTEM AND METHOD FOR OVER-CURRENT PROTECTION

FIELD OF THE INVENTION

Embodiments of the disclosure relate generally to systems and methods for over-current protection.

BACKGROUND OF THE INVENTION

Converters, particularly multi-level converters, are increasingly used for performing power conversion in a wide range of applications due to the advantages of high power quality waveform and high voltage capability. For example, multi-level converters may be used for performing DC-to-AC power conversion to supply single-phase or multi-phase AC voltages to electric motors in vehicles and pumps. Multi-level converters may also be used in power generation systems such as wind turbine generators and solar panels for performing DC-to-AC power conversion to supply single-phase or multi-phase AC voltages for power grid transmission and distribution.

Typically, the converters or the multi-level converters may include a plurality of switching elements/devices such as insulated gate bipolar transistors (IGBTs) and integrated gate commutated thyristors (IGCTs) which can be switched on and off in response to pulse signals supplied thereto. The IGBTs and IGCTs are semiconductor devices that are sensitive to electrical current flowing through the IGBTs/IGCTs. To prevent the IGBTs/IGCTs from being damaged by an over current, the IGBTs/IGCTs are typically provided with an over-current protection function. Conventionally, to simplify the implementation of the over-current protection function, an over-current threshold value is set to have a fixed value according to estimations in worst-case scenarios. The IGBTs/IGCTs can be turned off or shut down once the electrical current flowing through the switching element is determined to be exceeding the fixed over-current threshold value. However, simplified implementation of the over-current protection may result in an inadequate utilization of the capability of the converter.

Therefore, it is desirable to provide systems and methods for improved over-current protection to address one or more of the above-mentioned limitations of current systems and methods.

BRIEF DESCRIPTION OF THE INVENTION

In accordance with one aspect of the present disclosure, a power conversion system is provided. The power conversion system includes a power conversion device configured to convert electrical power from one form to another. The power conversion device comprises at least one switching element. The at least one switching element is capable of being turned off to block an electrical current flowing through the at least one switching element. The power conversion system further includes a control system electrically coupled to the power conversion device. The control system is configured to monitor an electrical current flowing through the at least one switching element and to monitor at least one parameter in association with the operation of the power conversion system. The control system is further configured to generate an over-current threshold value that is variable with respect to at least one monitored parameter.

In accordance with another aspect of the present disclosure, an over-current protection module is provided. The over-current protection module is operatively coupled to a power conversion device having at least one switching element. The over-current protection module includes an over-current threshold setting unit configured to receive at least one parameter in association with the operation of the power conversion device and generate an over-current threshold value variable with respect to the received at least one parameter. The over-current protection module further includes an over-current judging unit coupled to the over-current threshold setting unit. The over-current judging unit is configured to compare an actual electrical current flowing through the at least one switching element with the variable over-current threshold value and provide an over-current flag signal if the comparison indicates that the actual electrical current meets the variable over-current threshold value.

In accordance with another aspect of the present disclosure, a method for over-current threshold setting is provided. The method includes: monitoring at least one parameter in association with the operation of a power conversion device; and setting an over-current threshold value at least partly variable with respect to the monitored at least one parameter.

In accordance with another aspect of the present disclosure, a method for over-current protection is provided. The method includes: receiving at least one signal indicative of an electrical current flowing through a switching element disposed within a power conversion device; determining whether the received at least one signal is equal to or larger than an over-current threshold value, wherein the over-current threshold value is online adjusted based at least in part on one or more parameters monitored in association with the power conversion device; and transmitting at least one over-current flag signal in response to the determining that the received at least one signal is equal to or larger than the online adjusted over-current threshold value.

In accordance with another aspect of the present disclosure, a computer-readable storage medium is provided. The computer-readable storage medium includes a plurality of instructions stored thereon. The plurality of instructions are executed by a processor to achieve the following: monitoring at least one parameter in association with the operation of a power conversion device; and setting an over-current threshold value at least partly variable with respect to the monitored at least one parameter.

In accordance with another aspect of the present disclosure, a computer-readable storage medium is provided. The computer-readable storage medium includes a plurality of instructions stored thereon. The plurality of instructions are executed by a processor to achieve the following: receiving at least one signal indicative of an electrical current flowing through a switching element disposed within a power conversion device; determining whether the received at least one signal is equal to or larger than an over-current threshold value, wherein the over-current threshold value is online adjusted based at least in part on one or more parameters monitored in association with the power conversion device; and transmitting at least one over-current flag signal in response to the determining that the received at least one signal is equal to or larger than the online adjusted over-current threshold value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Embodiments disclosed herein generally relate to systems and methods of over-current protection which may be implemented to provide better protection for one or more semiconductor type devices used in a system as well as extend the power capability of the system that employs the one or more semiconductor type devices. As used herein, the semiconductor type devices may include any appropriate type of switching elements which can be selectively turned on and/or off to allow an electrical current to flow through and/or block the electrical current flow. Non-limiting examples of the switching elements that may be used in the system may include bipolar junction transistor (BJT), metal oxide semiconductor field effect transistor (MOSFET), gate turn off (GTO) thyristor, insulated gate bipolar transistor (IGBT), integrated gate commutated thyristor (IGCT), and silicon carbide (SiC) based devices. In one particular application, the disclosed over-current protection is a power conversion system which is configured to supply alternating current (AC) power to an electrical machine such as an AC electrical motor.

More specifically, the present disclosure proposes an improved over-current protection function which may be implemented to define or set a variable over-current threshold value for triggering or initiating one or more appropriate protection actions. In some embodiments, the over-current threshold value is set or adjusted to be variable with respect to one or more online monitored parameters in association with the operation of the system. For example, in some embodiments, electrical parameters such as direct current (DC) bus/link voltages corresponding to one or more switching elements may be obtained to set or adjust the over-current threshold value. In other embodiments, thermal parameters such as the temperature of one or more switching elements may be obtained to set or adjust the over-current threshold value.

The variable over-current threshold value can extend the power capability of the system (e.g., power conversion system). For example, in some embodiments, when the DC bus voltages corresponding to the one or more switching elements are dropping down (e.g., lower than a nominal DC bus voltage), the over-current threshold value can be set or adjusted to have a higher value. Such a higher over-current threshold value can allow the power conversion device to have more power output. Furthermore, the power conversion device (e.g., power converter) is better protected. For example, in some embodiments, when the DC bus voltages corresponding to the one or more switching elements are shooting up (e.g., larger than the nominal DC bus voltage), the over-current threshold value can be set or adjusted to have a lower value. As long as the actual or predicted current flowing through the one or more switching elements touches the lower over-current threshold value, one or more protection actions can be initiated to protect the one or more switching elements against over-current problems. Other technical advantages or benefits will become apparent to those skilled in the art by referring to the detailed descriptions and accompanying drawings provided below in accordance with one or more embodiments of the present disclosure.

Unless defined otherwise, technical and scientific terms used herein have the same meaning as is commonly understood by one of ordinary skill in the art to which this disclosure belongs. For example, the term "coupled" is used to describe electrical connections or couplings, which may be in a direct or indirect manner. The term "controller," "control system," and "processor" may include either a single component or a plurality of components, which are either active and/or passive components and may be optionally connected or otherwise coupled together to provide the described function.

Figure 1:
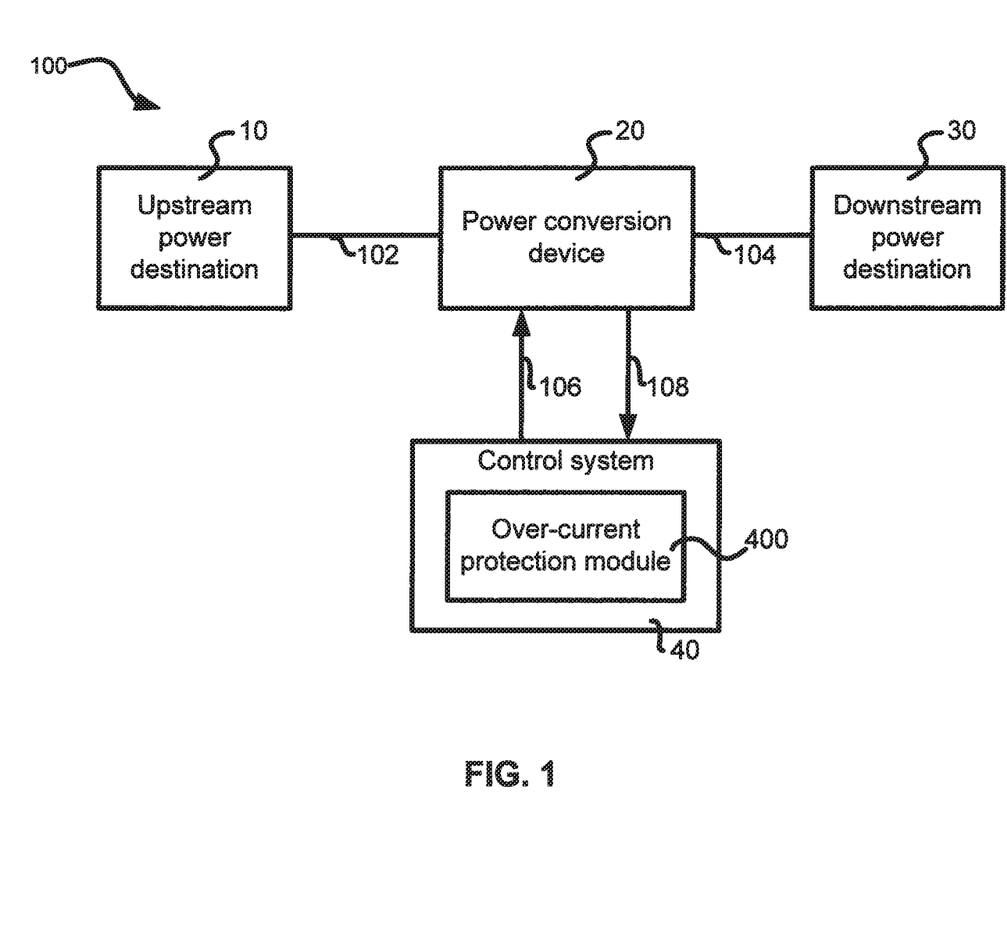
FIG. 1 is a simplified block diagram of a system in accordance with an exemplary embodiment of the present disclosure.

FIG. 1 illustrates a simplified block diagram of a system 100 in accordance with an exemplary embodiment of the present disclosure. The system 100 may be any appropriate converter based system that is capable of being configured to implement the over-current protection function disclosed herein. In some embodiments, the system 100 may be a multi-level converter based system suitable for high power and high voltage applications. As illustrated in FIG. 1, the system 100 generally includes a power conversion device 20 and a control system 40 coupled in communication with the power conversion device 20. In one embodiment, the control system 40 is in electrical communication with the power conversion device 20 and may transmit control signals to the power conversion device 20 via one or more electrical links or wires for example. In another embodiment, the control system 40 may be in optical communication with the power conversion device 20 and can transmit the control signals 106 to the power conversion device 20 via an optical communication link, such as one or more optical fibers for example. The control system 40 may include any suitable programmable circuits or devices such as a digital signal processor (DSP), a field programmable gate array (FPGA), a programmable logic controller (PLC), and an application specific integrated circuit (ASIC). The power conversion device 20 can be operated to perform power conversion and provide output current and/or voltage in response to the control signals 106 transmitted from the control system 40.

In one embodiment, the power conversion device 20 may include a plurality of switching elements/devices arranged in a predetermined topology. Non-limiting examples of the switching elements may include bipolar junction transistor (BJT), metal oxide semiconductor field effect transistor (MOSFET), gate turn off (GTO) thyristor, insulated gate bipolar transistor (IGBT), integrated gate commutated thyristor (IGCT), silicon carbide (SiC) based devices, and any other semiconductor based elements/devices. Non-limiting examples of the topology of the power conversion device 20 that may be driven by the control signals 106 generated with the control system 40 may include 2 level topology, a neutral point clamped (NPC) topology, a flying capacitor topology, an H-bridge topology, a cascaded H-bridge topology, a push-pull topology, and a parallel threads with common mode filter topology. The plurality of switching elements/devices can be switched on and off according to the control signals 106 for example pulse signals, to convert a first power 102 provided from an upstream power destination 10 to a second power 104 for a downstream power destination 30.

With continuing reference to FIG. 1, the first power 102 may be AC power or DC power that can be converted by the power conversion device 20 to provide the second power 104 of AC power or DC power. In one embodiment, the power conversion device 20 may comprise a DC-to-AC converter such as a multi-level inverter for converting the first power 102 having a DC form to second power 104 having an AC form. In another embodiment, the power conversion device 20 may comprise a DC-to-DC converter such as a single-active-bridge converter and a dual-active-bridge converter for converting the first power 102 having a DC form to second power 104 also having a DC form. Still in another embodiment, the power conversion device 20 may comprise an AC-to-DC converter such as a multi-level rectifier for converting the first power 102 having an AC form to second electric power 104 having a DC form. Yet in another embodiment, the power conversion device 20 may comprise an AC-to-AC converter such as a matrix converter for converting first power 102 having an AC form to second power 104 also having an AC form.

In some embodiments, the first power 102 may include single-phase, three-phase, or multi-phase AC power. In one embodiment, the upstream power destination 10 may include one or more power generation devices such as one or more wind turbines which are configured to provide variable-frequency electrical power. The power conversion device 20 may include one or more multi-level AC-DC converters and DC-AC converters for converting a variable-frequency electrical power 102 to a fixed-frequency electrical power 104, for example, 50 Hertz or 60 Hertz AC power. The fixed-frequency electrical power 104 may be supplied to the downstream power destination 30 such as a power grid for transmission and/or distribution. In some embodiments, the downstream power destination 30 may include a load such as an electric motor used in a vehicle, a fan, or a pump, which can be driven by the second power 104. In another embodiment, the upstream power destination 10 may include at least a part of a power grid for supplying single-phase or multi-phase AC power. In some embodiments, the upstream power destination 10 may also include one or more electrical devices such as one or more transformers for stepping up the voltage of the AC power or one or more rectifiers for performing AC-DC rectification to provide DC power for the power conversion device 20. In some embodiments, the power conversion device 20 may include or arranged in association with a DC-link for providing DC voltages to maintain the operation of the power conversion device 20.

With continuing reference to FIG. 1, in one embodiment, the control system 40 may include an over-current protection module 400 which can be implemented as software, firmware, hardware, or a combination thereof that is designed to achieve the function of protecting one or more switching elements in the power conversion device 20 against over-current problems. More specifically, the control system 40 or the over-current protection module 400 may receive one or more parameters 108 in association with the operation of the power conversion device 20. The one or more parameters 108 can be obtained through a variety of ways. For example, the one or more parameters 108 can be obtained with the use of one or more sensors or transducers. In other embodiments, the one or more parameters 108 can be obtained through calculation or estimation according to one or more known or measured electrical signals. The one or more parameters 108 used herein may represent historical version parameters that are in association with the operation of the power conversion device 20. In other embodiments, the one or more parameters 108 may represent estimated or predicted version parameters in association with the operation of the power conversion device 20.

In the illustrated embodiment, the one or more parameters 108 are particularly monitored to set or adjust the over-current threshold value in a manner that when the one or more parameters 108 are changing the over-current threshold value is changing correspondingly. In one embodiment, a mathematical function defined between the online monitored parameter and the over-current threshold value can be used to set or adjust the over-current threshold value. For example, the mathematical function may be a monotonically increasing function. That is, when the online monitored parameter is increasing, the over-current threshold value is increasing correspondingly. In another embodiment, the function defined between the online monitored parameter and the over-current threshold value can be a monotonically decreasing function. That is, when the online monitored parameter is increasing, the over-current protection value is decreasing. Furthermore, in some embodiments, the over-current threshold value can be changed continuously with respect to the online monitored parameter 108. In other embodiments, the over-current threshold value can be changed in a step manner. For example, a first fixed over-current threshold value is set to be corresponding to a first range of online monitored parameters. A second fixed over-current threshold value is set to be corresponding to a second range of online monitored parameters.

With continuing reference to FIG. 1, the control system 40 or the over-current protection module 400 may be further configured to receive one or more feedback signals 108 from the power conversion device 20. More specifically, in one embodiment, the control system 40 or the over-current protection module 400 may further receive one or more feedback electrical current signals 108 which represent the electrical current flowing through one or more switching elements of the power conversion device 20. As mentioned herein, the feedback electrical current signals 108 may represent an electrical current that flowed through the one or more switching element in the power conversion device 20 in one or more past control cycles. In other embodiments, the feedback electrical current signals 108 may represent an estimated or predicted electrical current that is flowing or will flow through the one or more switching element in the power conversion device 20 in the current or following one or more control cycles. The over-current protection module 400 is further configured to compare the online adjusted over-current threshold value with the feedback electrical current signals 108. Based on the comparison result, the over-current protection module 400 may generate an over-current status signal indicating that an over-current event is occurring or is possible to occur. As such, one or more protection actions can be initiated according to the over-current status signal.

More specifically, if the feedback electrical current signals 108 are determined to be equal to or below the online adjusted over-current threshold value, the over-current protection module 400 may generate a flag signal indicating that no over-current event has occurred or is occurring or no over-current event is potentially to occur with one or more switching elements in the power conversion device 20. In this situation, the power conversion device 20 is controlled to perform normal power conversion according to control signals 106 sent from the control system 40. On the other hand, if the feedback electrical current 108 is determined to be equal to or exceeding the over-current threshold value, the over-current protection module 400 may generate another flag signal indicative of an over-current event has occurred or is occurring or a potential over-current event will occur with one or more switching elements in the power conversion device 20. In this situation, in response to the over-current flag signal, one or more protections may be initiated to protect the one or more switching elements in the power conversion device 20.

The one or more protection actions initiated for protection of the one or more switching elements against over-current problems can be implemented in a variety of ways. For example, in one embodiment, the over-current protection module 400 or the control system 40 may send control signals to the power conversion device 20 to cause the current flowing through the one or more switching device to be reduced to an acceptable level (e.g., lower than the online adjusted over-current threshold value). In another embodiment, the over-current protection module 400 or the control system 40 may send a control signal according to the over-current flag signal to shut down the one or more particular switching elements in the power conversion device 20. Still in another embodiment, the over-current protection module 400 or control system 40 may send another control signal according to the over-current flag signal to shut down the power conversion device 20. That is, all the switching elements in the power conversion device 20 will be shut down. Still in some embodiments, the over-current protection module 400 or the control system 40 may send yet another control signal according to the over-current flag signal to shut down the whole system 100.

Figure 2:
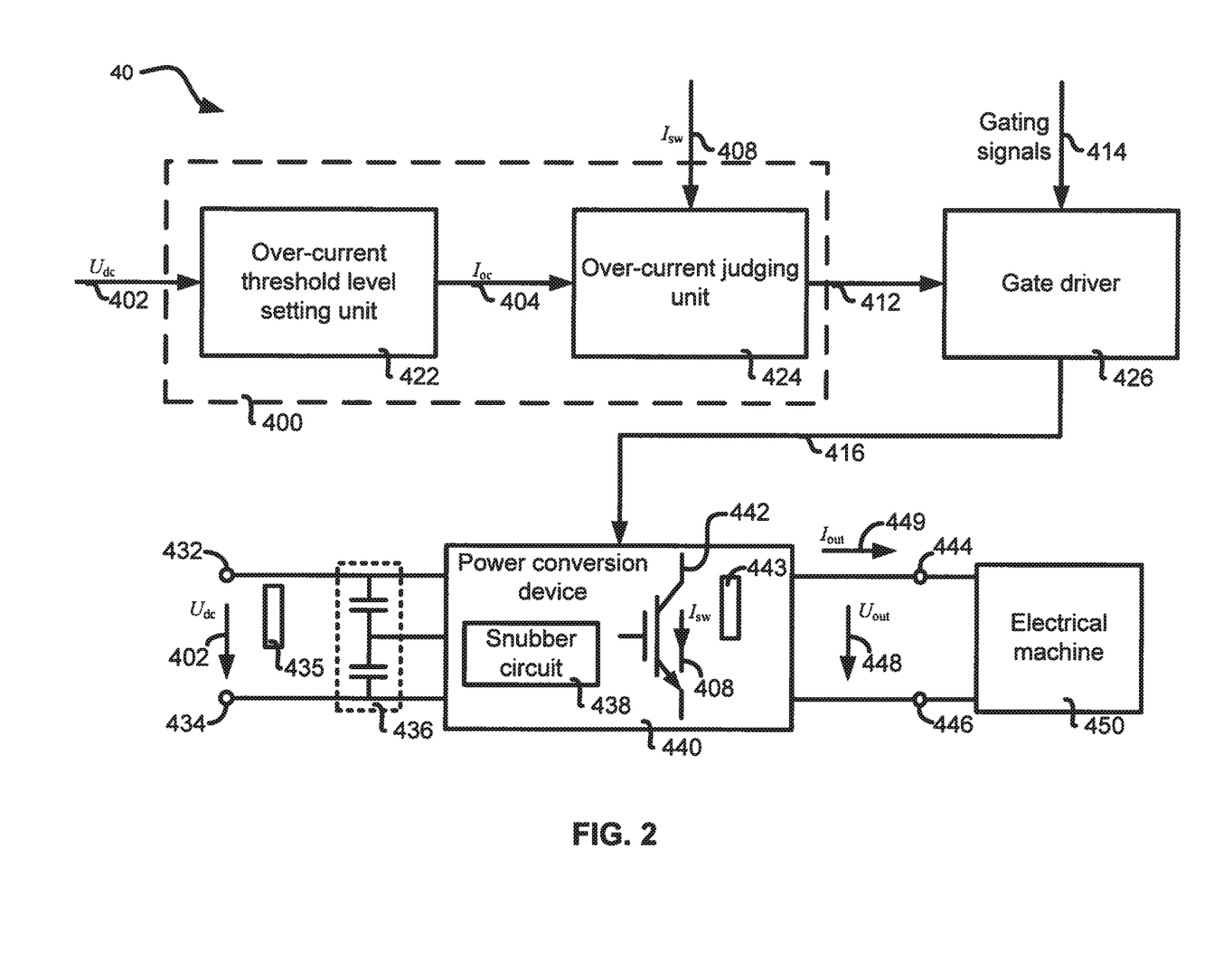
FIG. 2 is a schematic diagram illustrating a detailed structure of an over-current protection module and other components of the system shown in FIG. 1 in accordance with an exemplary embodiment of the present disclosure.

FIG. 2 is a schematic diagram illustrating a more detailed structure of an over-current protection module 400 and other components of the system 100 shown in FIG. 1 in accordance with an exemplary embodiment of the present disclosure. In the illustrated embodiment, for purpose of illustration, the over-current protection module 400 is shown to include an over-current threshold setting unit 422 and an over-current judging unit 424. In other embodiments, the over-current protection module 400 may include additional functional units and/or modules. For example, in some embodiments, the over-current protection module 400 may include a pre-processing unit for processing input signals (e.g., filtering and/or digitizing signals). In one embodiment, the over-current threshold setting unit 422 and the over-current judging unit 424 are implemented in software. As used herein, software refers to the over-current threshold setting unit 422 and the over-current judging unit 424 may be embodied as processor-executable instructions stored in one or more computer-readable storage medium. Examples of the computer-readable storage medium may include volatile memory (e.g., random access memory, RAM) and nonvolatile memory (e.g., read only memory, ROM) or any other memory devices. The processor-executable instructions can be retrieved from the computer-readable storage medium and executed by one or more processors to achieve the functionality of the over-current threshold setting unit 422 and the over-current judging unit 424 as described herein. The one or more processors can be a microprocessor or other suitable processing device configured to execute software instructions stored in the computer-readable storage medium. In other embodiments, the over-current threshold level setting unit 422 and the over-current judging unit 424 may be embodied as hardware or a combination of hardware and software.

With continuing reference to FIG. 2, the over-current threshold setting unit 422 is configured to receive one or more feedback DC voltage signals 402 and set or adjust an over-current threshold value 404 based at least in part on the feedback DC voltage signals 402. In one embodiment, as shown in the lower part of FIG. 2, the feedback DC voltage signals 402 may include a DC voltage at a DC link 436. In one embodiment, the DC link 436 includes two capacitors coupled in series. In other embodiments, the DC link 436 may include less than or more than two capacitors coupled in series or in parallel. The DC link 436 receives input power at a first input terminal 432 and a second input terminal 434 from other devices (e.g., a rectifier or a DC power source such as a solar panel). Further referring to FIG. 2, the DC link 436 may apply substantially stable DC voltages to one or more switching elements 442 in a power conversion device 440. The DC voltage signal 402 can be obtained by one or more voltage sensors 435 placed adjacent to the DC link 436. In other embodiments, the DC voltage signal 402 may be obtained through calculation or estimation.

In a more specific embodiment, the over-current threshold level setting unit 422 is configured to generate the over-current threshold value 404 by referring to a lookup table stored in a memory device in association with the over-current protection module 400. The lookup table may be manually pre-configured by an operator or automatically generated through calculation. In another embodiment, the over-current threshold value 404 can be generated through online calculations. A specific example as to generating or setting the over-current threshold value 404 variable with respect to the feedback DC voltage signals 402 will be described with more details below by referring to FIG. 3.

Figure 3:
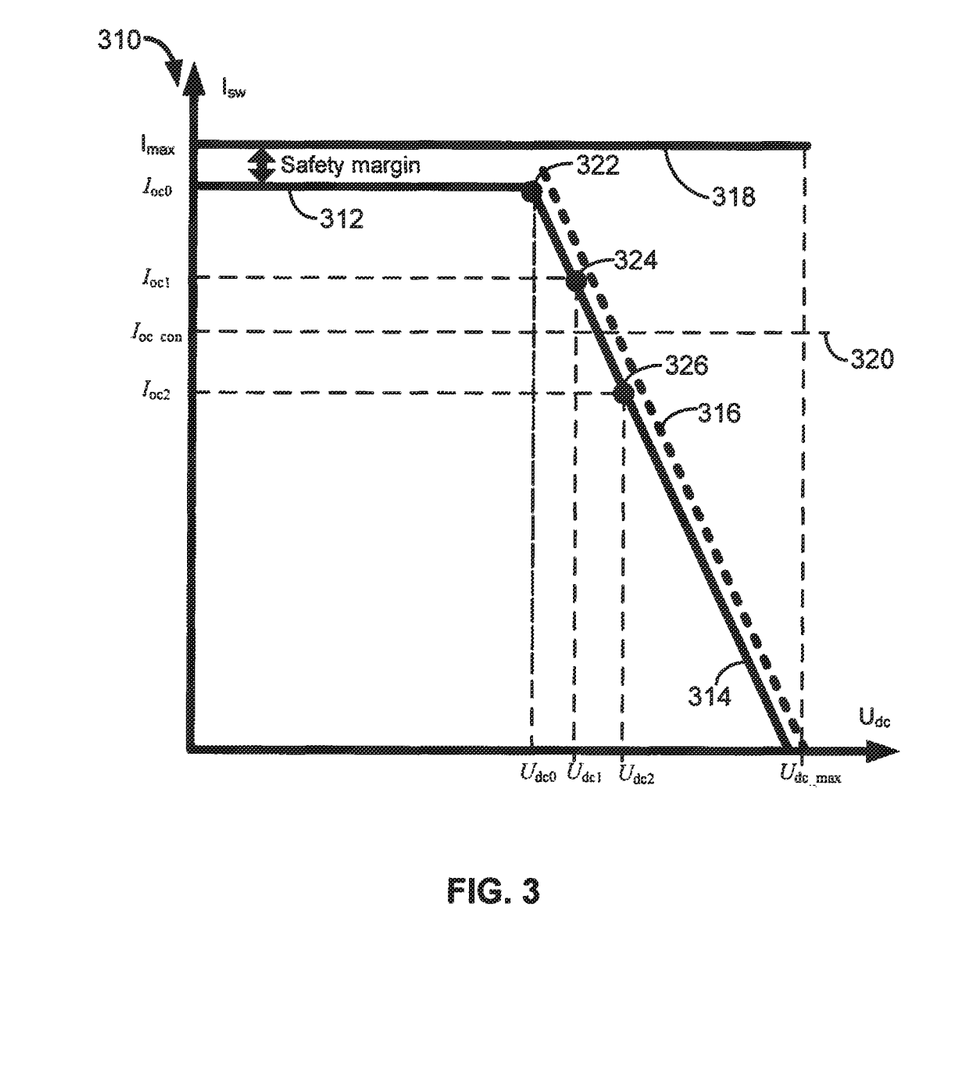
FIG. 3 is a graph illustrating the concept of setting or adjusting an over-current threshold value according to one or more DC voltages in accordance with one exemplary embodiment of the present disclosure.

FIG. 3 is a graph 310 illustrating the concept of generating or setting the over-current threshold value according to one or more DC voltages in accordance with one exemplary embodiment of the present disclosure. As shown in FIG. 3, the horizontal axis represents the DC voltage monitored at the DC link 436 (see FIG. 2) and the vertical axis represents various electrical current values. As shown in FIG. 3, in one embodiment, when the DC voltage is in a range from about zero to about $U_{dc0}$ (e.g., 2500 volts), a fixed over-current threshold value $I_{oc0}$ is set for the one or more switching elements 442 (see line segment 312). As is understood, when the DC link 436 is experiencing an under-voltage condition, the one or more switching elements 442 in the power conversion device 440 can withstand a higher electrical current. In this situation, the fixed over-current threshold value is set to be larger than a conventional fixed over-current threshold value $I_{oc\_con}$ (indicated by straight line 320).

As mentioned earlier, the conventional over-current threshold value may be generated according to estimations in worst-case scenarios. One of the problems of having such a fixed threshold over-current value may be insufficient utilization of the capability of the power conversion device 400 or the system 100. Notice that in the current embodiment, in the DC voltage range from about zero to about $U_{dc0}$, the over-current threshold value $I_{oc0}$ is still set to be smaller than a maximum current limit $I_{max}$ (indicated by straight line 318). The maximum limit $I_{max}$ is defined to ensure safe operation of the power conversion device 440. With this arrangement, when the input DC voltage applied to the one or more switching elements 442 in the power conversion device 440 is dropping below a nominal DC voltage (e.g., $U_{dc0}$), the one or more switching element 442 can be allowed to have more current to flow therethrough to extend the power capability of the power conversion device 440.

Further referring to FIG. 3, when the DC voltage is in a second voltage range, for example, from about $U_{dc0}$ to about $U_{dc\_max}$, a linear function is used for generating or setting the over-current threshold value. More particularly, in the illustrated embodiment, a linearly decreasing function 314 is used for setting or adjusting the over-current threshold value. That is, when the DC voltage is increasing, the over-current threshold value is decreasing. More specifically, as indicated at first point 324, when the DC voltage goes up to a first DC voltage of $U_{dc1}$, the over-current threshold value is set or adjusted to have a first over-current threshold value of $I_{oc1}$. The first over-current threshold value $I_{oc1}$ is still larger than the conventional fixed over-current threshold value $I_{oc\_con}$. Thus, the one or more switching elements 442 in the power conversion device 440 can still allow relatively larger electrical current to flow through to extend the power capability of the power conversion device 440 or the system 100. As indicated at second point 326, when the DC voltage further goes up to a second DC voltage of $U_{dc2}$, the over-current threshold value is reduced from the first over-current threshold value $I_{oc1}$ to a second over-current threshold value $I_{oc2}$. As is understood that, when the DC link 436 is experiencing an over-voltage condition, the electrical current flowing through the one or more switching elements 442 should be reduced to protect the one or more switching elements. Notice that at the second point 326, the second over-current threshold value $I_{oc2}$ is set to be lower than the conventional fixed over-current threshold value $I_{oc\_con}$. As long as the actual electrical current flowing through the one or more switching elements touches the second over-current threshold value $I_{oc2}$, one or more protection actions can be initiated to either reduce the electrical current flowing through the one or more switching elements or shut down the one or more switching elements 442 in the power conversion device 440. Thus, better over-current protection can be provided through the implementation of the current over-current protection module 40.

Further referring to FIG. 3, in some alternative embodiments, in addition to using the DC voltage parameters for over-current threshold setting or adjusting, the characteristic of one or more other electrical components can be taken into consideration for setting or adjusting the over-current threshold value. As shown in FIG. 2, in some embodiments, a snubber circuit 438 may be provided in association with the one or more switching elements 442 of the power conversion device 440. The snubber circuit 438 may be placed in parallel with the one or more switching elements 442 and is configured to provide a path for shunting electrical current when a switching element is turned off. In one embodiment, the characteristic of the snubber circuit 438 is further taken into consideration for setting or adjusting the variable over-current threshold value according to the DC voltage. As shown in FIG. 3, straight line 316 represents the limitation that the linearly decreasing function 314 should follow in setting the over-current threshold value according to the changing DC voltages. For example, at the second point 326, when the DC voltage has a value of $U_{dc2}$, the over-current threshold value should be set to be smaller than the second over-current threshold value $I_{oc2}$.

Referring back to FIG. 2, the over-current protection unit 400 further includes an over-current judging unit 424 which is coupled to the over-current threshold level setting unit 422 for receiving the over-current threshold value 404 generated with the over-current threshold level setting unit 422. The over-current judging unit 424 is further configured to receive one or more feedback electrical signals 408. In one embodiment, the one or more feedback electrical signals 408 are indicative of an electrical current that is flowing through the one or more switching elements 442. In one embodiment, the feedback electrical current signals 408 may be obtained with the use of one or more current sensors 443. In other embodiments, the feedback electrical current signals 408 may be obtained through calculation. The over-current judging unit 424 is further configured to compare the feedback electrical current signals 408 with the over-current threshold value 404. As discussed above, in the disclosed embodiment, the over-current threshold value 404 is online adjusted to be variable with respect to the online monitored DC voltages 402. In one embodiment, upon determining that the feedback electrical current signals 408 are equal to or larger than the over-current threshold value 404, the over-current judging unit 424 may generate an over-current flag signal 412 indicating that an over-current event has occurred or is occurring or a potential over-current event will occur with the one or more switching elements 442 in the power conversion device 440. On the other hand, if upon determining that the feedback electrical current signals 408 are equal to or less than the over-current threshold value 404, the over-current judging unit 424 may generate another flag signal 412 indicating that no over-current event has occurred or is occurring or will occur with one or more switching elements 442 in the power conversion device 440. In a specific embodiment, the flag signal 412 may be logic signals. For example, when an over-current event is occurring, the flag signal 412 may be logic "0," while when no over-current event is occurring, the flag signal 412 may be logic "1."

Further referring to FIG. 2, the over-current judging unit 424 is further in electrical communication with a gate driver 426 for transmitting flag signals 412 thereto. In one embodiment, when the flag signal 412 transmitted to the gate driver 426 indicates that an over-current event is occurring, the gate driver 426 is configured to modify the control signals transmitted to the power conversion device 440 to reduce the electrical current flowing through the one or more switching elements 442. In other embodiments, in response to the over-current flag signal 412, the gate driver 426 may transmit the control signals 416 to shut down the one or more switching elements 442 in the power conversion device 440 or alternatively shut down the power conversion device 440. In other embodiments, in response to the over-current signals 412, the gate driver 426 may transmit control signals 416 to shut down the whole system 100. On the other hand, when the flag signal 412 transmitted to the gate driver 416 indicates that there is no over-current event occurring, the gate driver 426 is configured to transmit control signals 416 to maintain normal operation of the power conversion device 440. For example, the gate driver 426 may transmit control signals 416 to the power conversion device 440 according to gate signals 414 generated from implementation with one or more modulation algorithms, including but not limited to, hysteresis based algorithm, pulse width modulation algorithm, optimized pulse pattern algorithm, and/or a combination thereof.

Further referring to FIG. 2, the power conversion device 440 is configured to perform power conversion according to the control signals 416 transmitted from the gate driver 426 and provide an output voltage 448 and an output current 449 at a first output terminal 444 and a second output terminal 446. In some embodiments, in implementation of the over-current protection module 400 described above, the output current 449 and the output voltage 448 can be modified in a manner to maintain a substantially constant power output. More specifically, as discussed above, the over-current threshold value 404 may be set or adjusted to have a higher value when the DC voltage 404 at the DC link 436 is lower than a nominal DC voltage. In this situation, the output current 449 can be increased and the output voltage 448 can be decreased to allow a constant power output from the power conversion device 440. In addition, the over-current threshold value 404 may be set or adjusted to have a lower value when the DC voltage 404 at the DC link 436 is higher than a nominal DC voltage. In this situation, the output current 449 can be decreased and the output voltage 448 can be increased to maintain the constant power output from the power conversion device 440. An exemplary measure to adjust the output voltage 448 may the change of the excitation of a connected electrical machine 450. This may be accomplished by the power conversion device 440 directly by changing the operating point of the electrical machine 450 via the terminals 444, 446 that are connected to the power conversion device 440 or indirectly by adjusting e.g. the excitation current when a separately excited synchronous machine is used.

Figure 4:
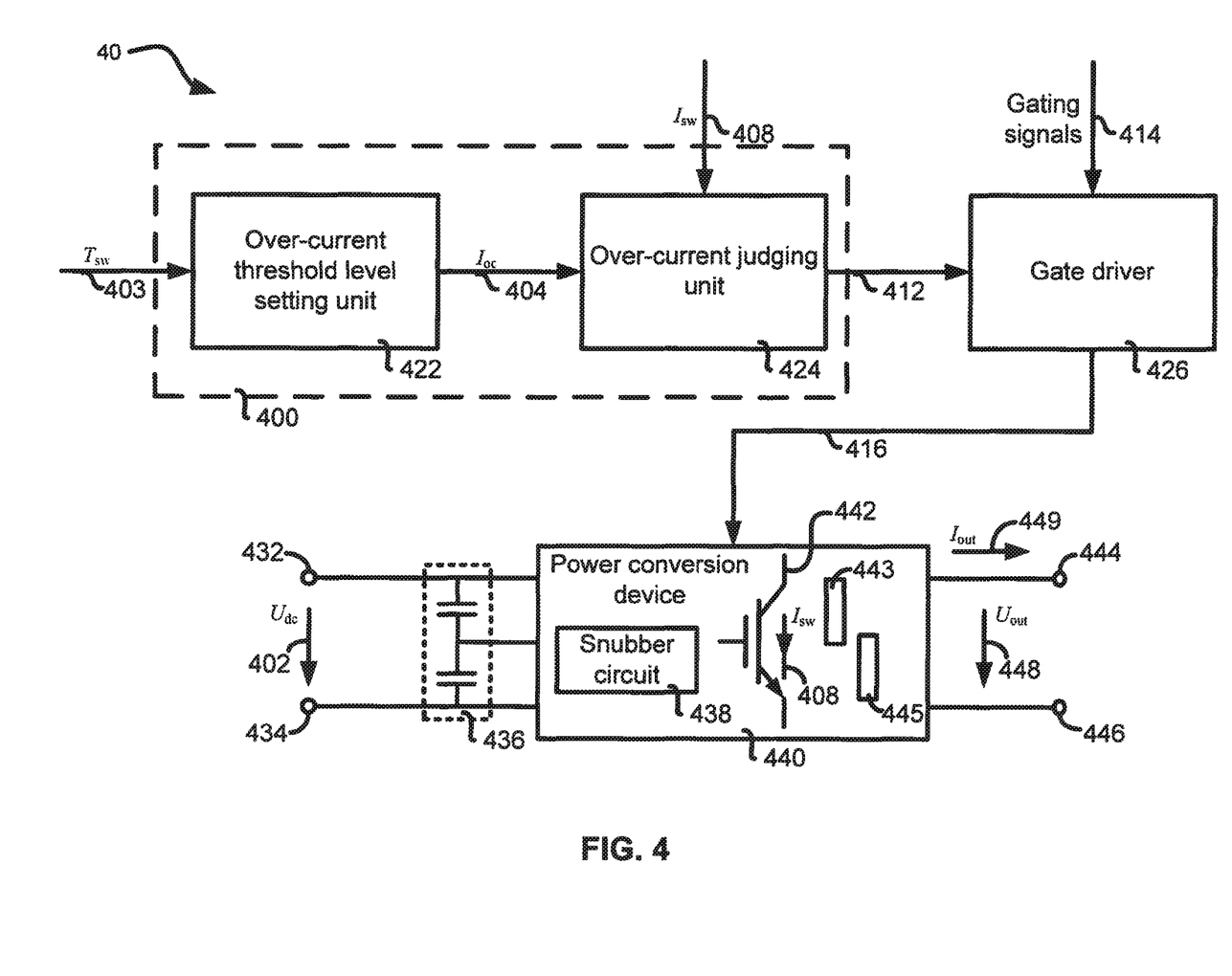
FIG. 4 is a schematic diagram illustrating a detailed structure of an over-current protection module and other components of the system shown in FIG. 1 in accordance with another exemplary embodiment of the present disclosure.

FIG. 4 is a schematic diagram illustrating a detailed structure of an over-current protection module 400 and other components of the system 100 shown in FIG. 1 in accordance with another exemplary embodiment of the present disclosure. The general structure and overall operation of the over-current protection module 400 is substantially similar to what has been described above with reference to FIG. 2. One of the differences of the embodiment shown in FIG. 4 is that the over-current threshold level setting unit 422 is configured to receive one or more temperature or thermal signals 403. The temperature or thermal signals 403 represent the temperature or thermal conditions of one or more switching elements 442 in the power conversion device 440. The temperature or thermal signals 403 may be obtained by one or more temperature or thermal sensors 445 placed in adjacent to the one or more switching elements 442. In other embodiments, the temperature or thermal signals 403 may be obtained by calculation or estimation based on one or more electrical parameters (e.g., electrical current and voltage) in association with the switching elements 442. In the illustrated embodiment, the over-current threshold level setting unit 422 is further configured to set or adjust the over-current threshold value 404 that is variable or changing with respect to the temperature or thermal signals 403.

More specifically, in one embodiment, the over-current threshold level setting unit 422 is configured to use a lookup table to map the over-current threshold value 404 according to the temperature or thermal signals 403. For example, when the obtained temperature or thermal signals 403 indicates that the temperature of the one or more switching elements 442 is increasing, the over-current threshold level setting unit 422 may map out a relatively lower over-current threshold value 404 from the look-up table. When the obtained temperature or thermal signals 403 indicates that the temperature of the one or more switching elements 442 is decreasing, the over-current threshold level setting unit 422 may map out a relatively higher over-current threshold value 404 from the look-up table. In other embodiments, the over-current threshold value 404 may be decreased when a decreasing temperature or thermal signal 403 is signaled. In other embodiments, the over-current threshold level setting unit 422 may set or adjust the over-current threshold value 404 according to other methods, such as online calculation.

Figure 5:
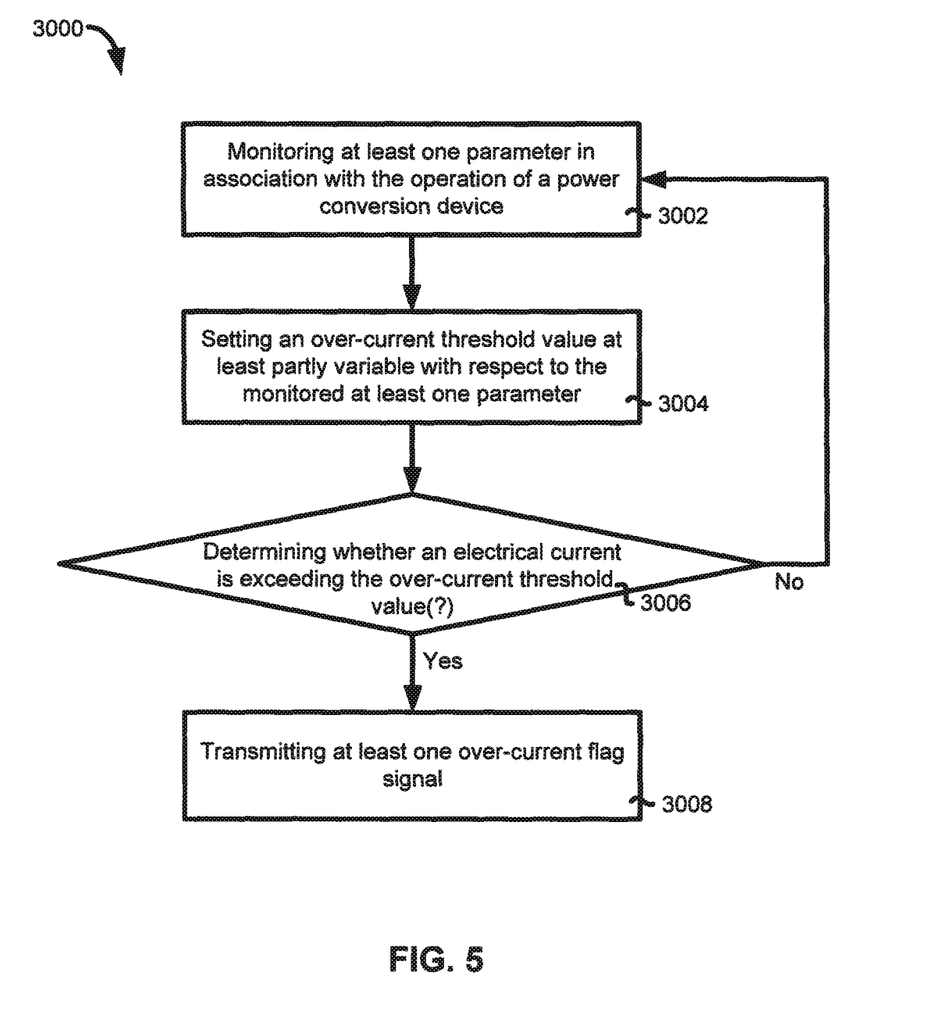
FIG. 5 is a flowchart which outlines an implementation of a method for over-current protection in accordance with another exemplary embodiment of the present disclosure.

FIG. 5 is a flowchart which outlines an implementation of a method 3000 for over-current protection in accordance with one exemplary embodiment of the present disclosure. The method 3000 may be executed by the control system 40 of the system 100 shown in FIG. 1 for protection of one or more switching elements against over-current problems. At least some of the blocks/actions illustrated in method 3000 may be programmed with software instructions stored in a computer-readable storage medium. The computer-readable storage medium may include volatile and nonvolatile, removable and non-removable media implemented in any method or technology. The computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by one or more processors.

In one embodiment, the method 3000 may start to implement from block 3002. At block 3002, at least one parameter in association with the operation of a power conversion device is monitored. In one embodiment, the at least one parameter may include electrical parameter such as at least one DC voltage. As described above, in one embodiment, one or more voltage sensors 435 placed adjacent to a DC link 436 is used to online measure DC voltages across the DC link 436. In other embodiments, the DC voltages at the DC link 436 can be monitored through calculation. In another embodiment, the at least one parameter may include thermal or temperature parameters of one or more switching elements in the power conversion device. The thermal or temperature parameters may be obtained by measurement with one or more thermal sensors placed adjacent to the one or more switching elements 422. In other embodiments, the thermal or temperature parameters may be obtained through calculation.

At block 3004, the method 3000 continue to implement by setting or adjusting an over-current threshold value at least partly variable with respect to the monitored at least one parameter. As describe above, in one embodiment, a lookup table is used to map out the over-current threshold value according to at least one DC voltage. For example, when the monitored DC voltage is dropping below a nominal DC voltage, the over-current threshold value is set to have relatively higher value. This means that the one or more switching devices in the power conversion device can be allowed to have a relatively higher electrical current to flow through. Thus, the power capability of the power conversion device can be extended. On the other hand, when the monitored DC voltage is increasing, the over-current threshold value is set to have a relatively lower value. Lower over-current threshold value can offer better protection of the switching elements against over-current problems. In another embodiment, the over-current threshold value is set or adjusted according to the online monitored thermal or temperature signals. In addition, in one embodiment, the over-current threshold value can be set or adjusted to have a fixed value when the DC voltage is in a first range (e.g., ranging from about zero to about $U_{dc0}$). Also, the over-current threshold value can be set or adjusted to be change in a linear manner when the DC voltage is in a second range (e.g., ranging from about $U_{dc0}$ to about $U_{dc\_max}$).

At block 3006, the method 3000 continues to implement by making a determination as to whether an electrical current of the one or more switching elements is equal to or exceeding the over-current threshold value. If the determination is positive, the procedure proceeds to block 3008 to implement. Otherwise, the procedure returns to block 3002 to further monitor the at least one parameters. The electrical current used for determining may be a real-time electrical current flowing through the one or more switching elements or may be an estimated or predicted electrical current that will flow through the one or more switching elements.

At block 3008, following the positive determination that the electrical current of the one or more switching elements is equal to or exceeding the over-current threshold value, at least one over-current flag signal is generated. The at least one over-current flag signal is used to initiate one or more protection actions to protect the one or more switching elements against over-current problems. For example, as described above with reference to FIG. 2, the over-current flag signal 412 may be transmitted to a gate driver 426, which in turn transmits control signals 416 to the power conversion device 440 to turn off the one or more switching elements in the power conversion device 440. Alternatively, the over-current flag signal 412 may be used to transmit control signals 416 to shut down the power conversion device 440 or shut down the whole system 100.

The method 3000 described above with reference to FIG. 5 may be modified in a variety of ways. For example, in some embodiments, the method 3000 may include additional one or more blocks/actions. In one embodiment, the method 3000 may include an additional block which may be implemented after block 3004. In this additional block, the power conversion device 440 can be controlled to provide a constant power output. For example, when the over-current threshold value is increased to a higher value, the power conversion device 440 can be controlled to provide a reduced voltage output and increased current output, such that the output power can be kept constant. In another embodiment, when the over-current threshold value is decreased to a lower value, the power conversion device 440 can be controlled to provide an increased voltage output and a decreased current output, such that the output power can also be maintained constant.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power conversion system, comprising:
   a power conversion device configured to convert electrical power from one form to another, the power conversion device comprising at least one switching element, the at least one switching element capable of being turned off to block an electrical current flowing through the at least one switching element; and
   a control system electrically coupled to the power conversion device, the control system configured to monitor the electrical current flowing through the at least one switching element and to monitor at least one parameter in association with the operation of the power conversion system;
   wherein the at least one parameter used for generating a variable over-current threshold value comprises a direct-current (DC) bus voltage corresponding to the at least one switching element;
   wherein the at least one switching element has an associated maximum current limit that ensures safe operation of the at least one switching element, the maximum current limit having a substantially constant value when the DC bus voltage is equal to or below a predetermined DC voltage (Udc0) and which decreases in a linear manner when the DC bus voltage increases above the predetermined DC voltage (Udc0); and
   wherein the control system is further configured to generate an over-current threshold value that is less than the maximum current limit for all DC bus voltages, has a substantially constant value when the DC bus voltage is equal to or below the predetermined DC voltage (Udc0) and decreases in a linear manner when the DC bus voltage increases above the predetermine DC voltage (Udc0).

2. The power conversion system of claim 1, wherein the control system is further configured to determine whether the electrical current flowing through the at least one switching element is equal to or exceeding the variable over-current threshold value, and transmit an over-current flag signal upon determination that the electrical current is equal to or exceeding the variable over-current threshold value.

3. The power conversion system of claim 2, wherein the over-current flag signal is used for at least one of (i) turning off the at least one switching element, (ii) shutting down the power conversion device, and (iii) shutting down the power conversion system.

4. The power conversion system of claim 2, wherein the electrical current flowing through the at least one switching element is measured with at least one current sensor.

5. The power conversion system of claim 2, wherein the electrical current represents a historical version of the electrical current flowing through the at least one switching element.

6. The power conversion system of claim 2, wherein the electrical current represents a predicted version of the electrical current that will flow through the at least one switching element.

7. The power conversion system of claim 1, further comprising a snubber circuit in parallel with the at least one switching element and wherein a characteristic of the snubber circuit is further taken into consideration for setting or adjusting the variable over-current threshold value according to the DC bus voltage.

8. The power conversion system of claim 7, wherein the control system is further configured to increase an output voltage from the power conversion device and reduce an output current from the power conversion device when the over-current threshold value is decreasing.

9. The power conversion system of claim 7, further comprising an electrical machine coupled to the power conversion device, and wherein the increase wherein an increase of an output voltage from the power conversion device is achieved by increasing an excitation of the electrical machine.

10. The power conversion system of claim 1, wherein the at least one parameter used for generating the over-current threshold value comprises at least a temperature of the at least one switching element.

11. The power conversion system of claim 10, wherein the temperature of the at least one switching element is obtained through measurement with a sensor.

12. The power conversion system of claim 10, wherein the temperature of the at least one switching element is obtained by estimation.

13. An over-current protection module operatively coupled to a power conversion device having at least one switching element, the over-current protection module comprising:
   an over-current threshold setting unit configured to receive at least one parameter in association with the operation of the power conversion device and generate an over-current threshold value variable with respect to the received at least one parameter; and
   an over-current judging unit coupled to the over-current threshold setting unit, the over-current judging unit configured to compare an actual electrical current flowing through the at least one switching element with the variable over-current threshold value and provide an over-current flag signal if the comparison indicates that the actual electrical current meets the variable over-current threshold value;
   wherein the at least one parameter used by the over-current threshold setting unit for generating the variable over-current threshold value comprises a direct-current (DC) bus voltage corresponding to the at least one switching element;
   wherein the at least one switching element has an associated maximum current limit that ensures safe operation of the at least one switching element, the maximum current limit having a substantially constant value when the DC bus voltage is equal to or below a predetermined DC voltage (Udc0) and which decreases in a linear manner when the DC bus voltage increases above the predetermined DC voltage (Udc0); and
   wherein the over-current threshold setting unit is further configured to generate an over-current threshold value that is less than the maximum current limit for all DC bus voltages, has a substantially constant value when the DC bus voltage is equal to or below the predetermined DC voltage (Udc0) and decreases in a linear manner when the DC bus voltage increases above the predetermined DC voltage (Udc0).

14. A method for over-current threshold setting and over-current protection, comprising:
   monitoring at least one parameter in association with the operation of a power conversion device with a switching element; and
   setting an over-current threshold value at least partly variable with respect to the monitored at least one parameter;
   wherein the at least one monitored parameter comprises a direct-current (DC) bus voltage corresponding to the switching element;
   wherein the switching element has an associated maximum current limit that ensures safe operation of the at least one switching element, the maximum current limit having a substantially constant value when the DC bus voltage is equal to or below a predetermined DC voltage (Udc0) and which decreases in a linear manner when the DC bus voltage increases above the predetermined DC voltage (Udc0); and
   wherein the set over-current threshold value is less than the maximum current limit for all values of the DC bus voltage, has a substantially constant value when the monitored DC bus voltage is equal to or below the predetermined DC voltage (Udc0) and decreases in a linear manner when the DC bus voltage increases above the predetermined DC voltage (Udc0).

* * * * *